(12) United States Patent
Nishio (10) Patent No.: US 7,676,937 B2
(45) Date of Patent: Mar. 16, 2010

(54) SCRIBE HEAD AND SCRIBE DEVICE (75) Inventor: Yoshitaka Nishio, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 601 days.

(21) Appl. No.: 10/596,879

(22) PCT Filed: Dec. 28, 2004

(86) PCT No.: PCT/JP2004/019655

§ 371 (c)(1),
(2), (4) Date: Dec. 11, 2006

(87) PCT Pub. No.: WO2005/063460

PCT Pub. Date: Jul. 14, 2005

(65) Prior Publication Data

US 2007/0180715 A1 Aug. 9, 2007

(30) Foreign Application Priority Data

Dec. 29, 2003 (JP) ............................ 2003-436932

(51) Int. Cl.
*B43L 13/00* (2006.01)

(52) U.S. Cl. ........................................ 33/18.1; 33/32.3

(58) Field of Classification Search .................. 33/18.1, 33/32.1, 32.3, 41.1, 41.4
See application file for complete search history.

(56) References Cited

U.S. PATENT DOCUMENTS 2,357,206 A * 8/1944 Klages ........................ 33/32.3
2,403,633 A * 7/1946 Browning ..................... 33/435
4,221,150 A * 9/1980 Bergfelt et al. ................ 83/882
6,427,357 B1 * 8/2002 Piper ............................. 33/679
6,822,315 B2 * 11/2004 Kelkar et al. ................. 257/620
6,901,670 B2 * 6/2005 Wakayama et al. ........... 33/18.1
7,439,665 B2 * 10/2008 Wakayama .................. 313/493
2004/0155085 A1 * 8/2004 Takamatsu et al. .............. 225/2

FOREIGN PATENT DOCUMENTS

| JP | 09-025134 | 1/1997 |
| JP | 2002-274875 | 9/2002 |
| JP | 2003-267742 | 9/2003 |
| WO | WO 03/01177 A1 | 2/2003 |

OTHER PUBLICATIONS

International Search Report dated Apr. 5, 2005.

* cited by examiner

*Primary Examiner*—G. Bradley Bennett
*Assistant Examiner*—Tania C Courson
(74) *Attorney, Agent, or Firm*—Snell & Wilmer L.L.P.

(57) ABSTRACT

A scribing head according to the present invention includes: a scribing line forming means (29) structured so as to form a scribing line on a substrate; and a moving means (502, 503) for moving the scribing line forming means such that the scribing line forming means presses the substrate with a constant magnitude, wherein the moving means includes: a rotation means (502) rotating about a rotation axis, the axial center of the rotation axis being provided so as to align with a predetermined direction in which the scribing line forming means moves, and a motive power transmission means (503) for transmitting a motive power between the motive power transmission means and the scribing line forming means such that the scribing line forming means moves on a straight line along the axial center of the rotation axis in response to the rotation of the rotation means, the motive power transmission means being provided along the predetermined direction.

8 Claims, 9 Drawing Sheets

PRIOR ART

FIG.8

PRIOR ART

FIG.9

PRIOR ART

SCRIBE HEAD AND SCRIBE DEVICE

TECHNICAL FIELD

The present invention relates to a scribing head used to form a scribing line on a substrate and a scribing apparatus including the scribing head.

BACKGROUND ART

For example, when a glass substrate (including a brittle material) is cut into a desired size, a cutting edge of a cutter wheel is pressed onto a surface of the brittle material with a predetermined force and is moved on the surface of the glass substrate. As a result, a scribing line is formed (hereinafter, referred to as a "scribing step"). Thereafter, a predetermined force is applied to the glass substrate along the scribing line (hereinafter, referred to as a "breaking step"). As a result, the glass substrate is cut along the scribing line.

Figure 7:
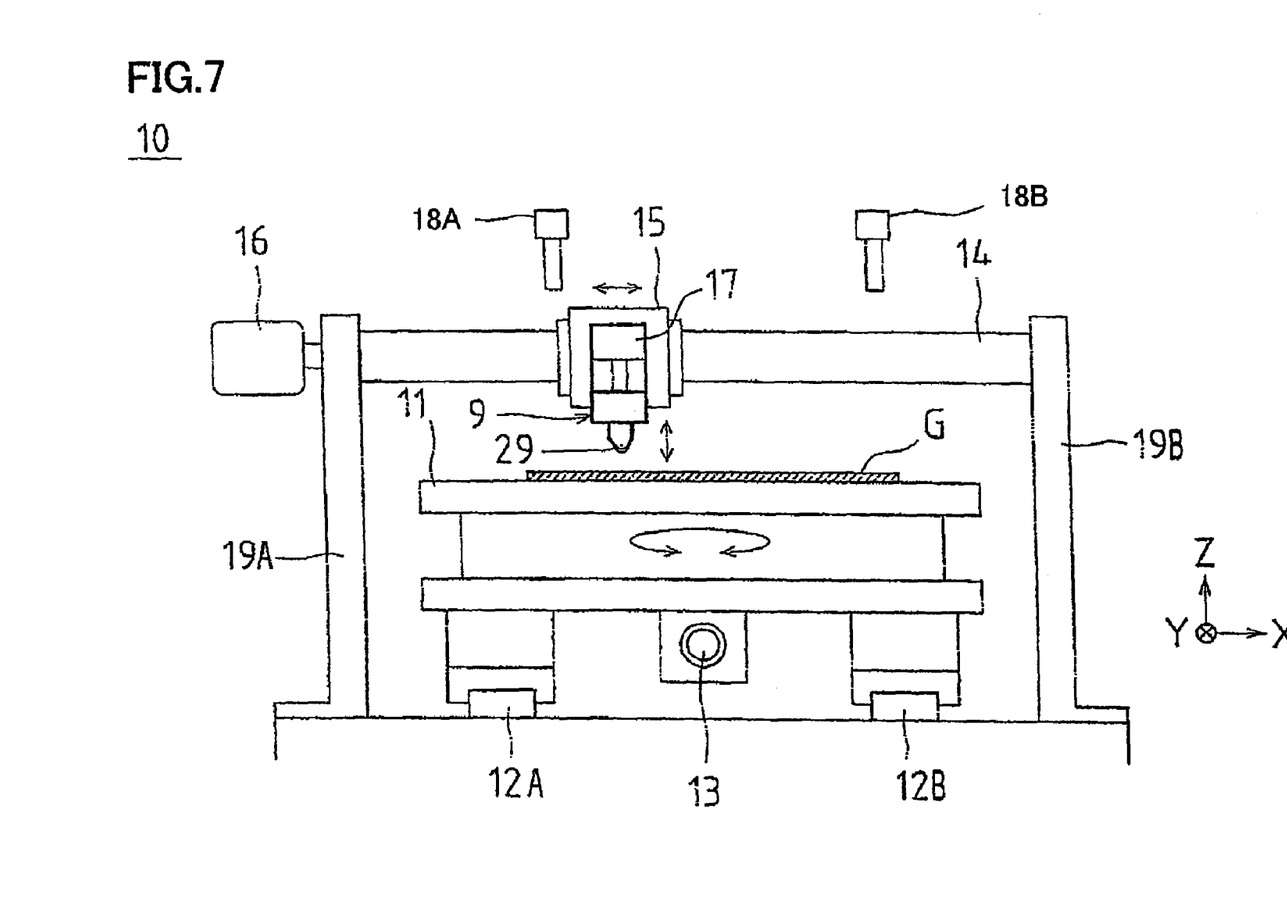
FIG. 7 is diagram showing an example of a structure of a prior art scribing apparatus 10.

FIG. 7 shows an example of a structure of a conventional scribing apparatus 10. The scribing apparatus 10 performs the scribing step.

The scribing apparatus 10 includes a table 11, a first guide rail 12A, a second guide rail 12B and a ball screw 13.

The table 11 is structured so as to be rotatable in a horizontal plane. A vacuum adsorption means (not shown) is provided in the table 11. The vacuum adsorption means fixes a substrate G (e.g., brittle substrate including a glass plate) mounted on the table 11 to the table 11. The first guide rail 12A and the second guide rail 12B support the table 11 such that the table 11 is movable in the Y-direction. The first guide rail 12A and the second guide rail 12B are provided in parallel to each other. The ball screw 13 moves the table 11 along the first guide rail 12A and the second guide rail 12B.

The scribing apparatus 10 further includes a first pillar 19A, a second pillar 19B, a guide bar 14, a sliding unit 15 and a first motor 16.

The first pillar 19A and the second pillar 19B are vertically provided on a base of the scribing apparatus 10 having the first guide rail 12A and the second guide rail 12B interposed therebetween. The guide bar 14 is provided above the table 11 along the X-direction and constructed between the first pillar 19A and the second pillar 19B. The sliding unit 15 is provided on the guide bar 14 so as to be slidable. The first motor 16 slides the sliding unit 15.

The scribing apparatus 10 further includes a scribing head 9, a second motor 17 for moving the scribing head 9 upward and downward, a first CCD camera 18A and a second CCD camera 18B. The second motor 17 holds the scribing head 9 at a predetermined height in the scribing step. The first CCD camera 18A and the second CCD camera 18B are provided above the guide bar 14 and detect an alignment mark formed on the substrate G.

The scribing head 9 is provided in the sliding unit 15. The scribing head 9 includes a cutter wheel 29.

The scribing head 9 presses the cutter wheel 29 onto the surface of the substrate G. When the motor 16 slides the sliding unit 15, the scribing head 9 moves along the guide bar 14. As a result, the cutter wheel 29 moves on the surface of the substrate G while it is being pressed onto the surface of the substrate G, and a scribing line is formed on the surface of the substrate G.

International Publication No. WO03/011777 pamphlet (Reference 1) discloses a scribing head. This scribing head includes a servo motor and a cutter wheel 29. The scribing head is structured such that the torque of a rotation axis of the servo motor is transmitted to the cutter wheel 29 directly or via a gear, and the cutter wheel 29 is pressed onto the surface of the substrate G. Since the cutter wheel 29 is pressed onto the substrate G with a predetermined force by the servo motor, for example, when compared to the case in which the cutter wheel 29 is pressed onto the substrate G with a predetermined force by an air cylinder, an excellent temporal followablity with respect to the change of reaction force from the substrate G, and an excellent controllability and responsiveness with respect to the magnitude of the reaction force are obtained.

Figure 8:
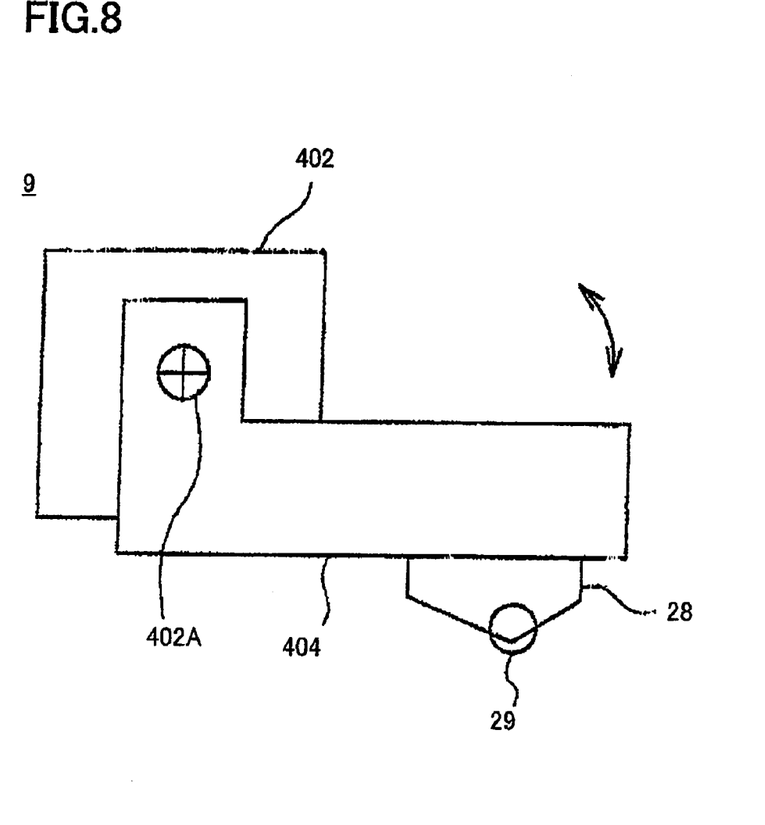
FIG. 8 is a diagram showing an example of a structure of a prior art scribing head 9.

FIG. 8 shows an example of a structure of a conventional scribing head 9. The scribing head 9 is a scribing head disclosed in Reference 1. The scribing head 9 is structured so as to directly transmit the torque of the rotation axis of the servo motor to the cutter wheel 29.

The scribing head 9 includes a servo motor 402, a holder holding member 404, a cutting edge holder 28 which is held by the holder holding member 404 and a cutter wheel 29 which is rotatable about a pin inserted at the lower end of the cutting edge holder 28.

The servo motor 402 of scribing head 9 is, for example, held by a sliding unit 15 (see FIG. 7). When a rotation axis 402A of the servo motor 402 is turned, the cutter wheel 29 is moved upward and downward via the holder holding member 404 and the cutting edge holder 28. Owing to such a structure, the servo motor 402 generates a torque in a direction in which the rotation axis 402A turns clockwise (see FIG. 8), and presses the cutter wheel 29 onto a brittle material substrate.

Figure 9:
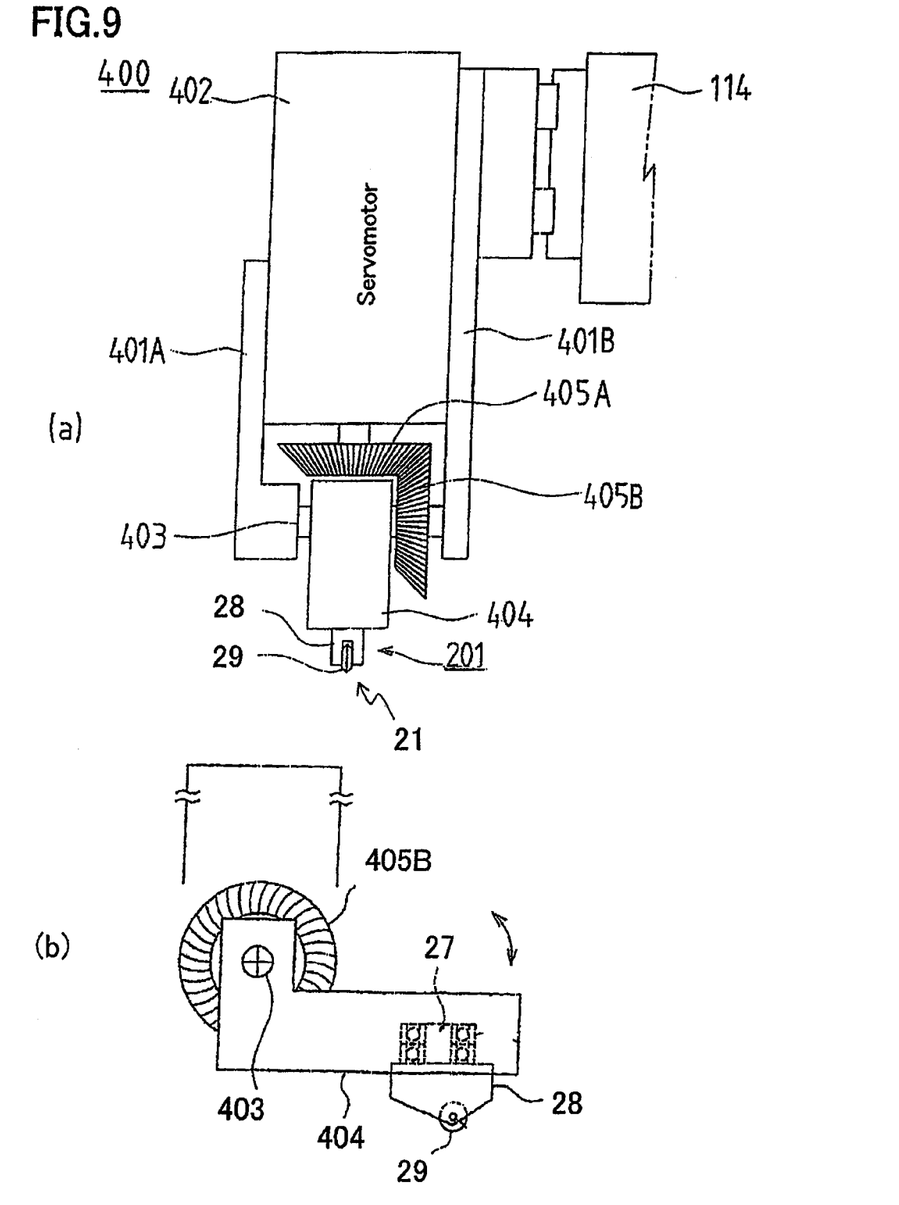
FIG. 9 is a diagram showing a structure of a scribing head 400, which is another example of the prior art scribing head.

FIG. 9 shows a structure of another example of the conventional scribing head 400. FIG. 9(a) shows a side view of the scribing head 400. FIG. 9(b) shows a front view of relevant parts of the scribing head 400. The scribing head 400 is a scribing head disclosed in Reference 1. In FIG. 9, the same components as those shown in FIG. 8 are denoted by the same reference numerals, and the description thereof will be omitted.

The scribing head 400 includes a first side wall 401A, a second side wall 401B, a servo motor 402 which is fixed between the first side wall 401A and the second side wall 401B in an upside down manner, an L-shaped holder holding member 404, a spindle 403, which is provided at the bottom portion of the first side wall 401A and the second side wall 401B, for supporting the holder holding member 404 such that the holder holding member 404 is rotatable, and a scribing line forming mechanism 21. The scribing line forming mechanism 21 includes a turning axis 27, a cutting edge holder 28 and a cutter wheel 29. The cutting edge holder 28 is fixed to the turning axis 27 and is held by the holder holding member 404 so as to be turnable via the turning axis 27.

A first bevel gear 405A is firmly fixed to an output axis of the servo motor 402. A second bevel gear 405B is firmly fixed to the spindle 403. The first bevel gear 405A and the second bevel gear 405B are provided so as to engage with each other. Thus, when the servo motor 402 is rotated in a positive direction or a negative direction, the holder holding member 404 turns about the spindle 403, and the scribing line forming mechanism 21 moves upward or downward, respectively. Owing to such a structure, the servo motor 402 generates a torque in a direction in which the spindle 403 turns clockwise (see FIG. 9(b)) and presses the cutter wheel 29 onto the brittle material substrate.

Furthermore, Japanese Laid-Open Publication No. 2001-206727 (Reference 2) discloses a scribing head A which is another example of the conventional scribing head. The scribing head A, similar to the scribing head 400, transmits the motive power of a servo motor to a cutter wheel via a gear (specifically, a rack-and-pinion).

Reference 1: International Publication No. WO03/011777 pamphlet

Reference 2: Japanese Laid-Open Publication No. 2001-206727

DISCLOSURE OF THE INVENTION

Generally, the surface of the substrate G is not a perfectly flat face. The substrate G has undulations across the entire substrate G in addition to slight differences in thickness of the substrate G itself. Furthermore, while the cutter wheel 29 is pushed into the substrate G by an amount of about several μm to several tens of μm, a scribing line is formed. Thus, it seems that the substrate G is formed flatly with a high accuracy. However, the substrate G has sharp undulations in the order of several μm. As a result, in order to perform a scribing on the substrate G while maintaining a predetermined cutting edge load, the servo motor 402 must move the cutter wheel 29 upward and downward in accordance with the change of the undulations of the main surface of the substrate G.

The holder holding member 404 included in the scribing head 9 turns about the rotation axis 402A. Thus, due to the undulations of the main surface of the substrate G, the angle of the holder holding member 404 with respect to the main surface of the substrate G changes. Therefore, the cutting edge load of the cutter wheel 29 vertical to the main surface of the substrate G does not correspond to the torque of the servo motor 402 in a linear manner. As a result, even if the torque of the servo motor 402 is maintained at a predetermined value, the cutting edge load of the cutter wheel 29 vertical to the main surface of the substrate G changes due to the angular change of the holder holding member 404.

In order to solve this problem, it is considered that the torque of the servo motor 402 is corrected by detecting the angle of the holder holding member 404 with respect to the main surface of the substrate G. However, the computational control process for correcting the toque becomes complex, and at the same time, a time-lag occurs, wherein the time-lag is the time lapsed from the time the angle of the bearing case 25 is detected to the time the change of the corrected torque actually acts on the servo motor 402. Therefore, it is difficult to maintain the cutting edge load constant in response to the undulations of the substrate G.

A gear-type motive power transmission means (e.g., at least one of the first bevel gear 405A and the second bevel gear 405B) included in a gear-type scribing head (scribing head 400 and scribing head A) has a backlash (clearance between cutting faces adjacent to each other) for ensuring a smooth operation. As a result, when the servo motor 402 cannot follow the upward-and-downward operation of the cutter wheel 29, there are cases in which the cutting edge load instantaneously and vastly changes. Even if the servo motor 402 is constantly and electrically tuned, there is a limitation in improving the followability so as to correspond to the undulations of the main surface of the substrate G. Also, it is not feasible in view of time and cost to tune the servo motor 402 such that the servo motor 402 possesses an optimal electrical control characteristic.

Furthermore, in the gear-type motive power transmission means, the efficiency that the torque is transmitted to the cutter wheel 29 from the servo motor 402 and is converted into a load (positive efficiency); and the transmission efficiency that the change of the torque from the cutter wheel 29 is transmitted to the servo motor 402 (negative efficiency) are not always same. Therefore, the responsiveness of the servo motor 402 to the increase of the cutting edge load becomes inefficient. Specifically, when the cutting edge load is increased due to undulations on the main surface of the substrate G and the like, it is difficult to operate such that the output axis of the servo motor 402 is pushed back in a direction opposite to the load direction in order to keep a predetermined torque while an excellent preciseness and responsiveness of the servo motor 402 are ensured. As a result, an excessive load beyond the predetermined cutting edge load is applied to the main surface of the substrate G. Therefore, there is a risk that a defect (e.g., fissure and chip) occurs in the vicinity of the formed scribing line on the substrate G.

Furthermore, the scribing head 9 needs a footprint space for the servo motor 402 on the side of the cutter wheel 29. Thus, when a plurality of scribing heads is provided in line in a direction perpendicular to the movement direction in a scribing step and the scribing head 9 is used in a multi-scribing apparatus for simultaneously forming a plurality of scribing lines which are parallel to each other, it is difficult to shorten the separation distance between the cutter wheels 29. As a result, the lower limit for the interval of each scribing line to be formed simultaneously is significantly limited.

The present invention is made in view of the problems described above. The objective of the present invention is to provide: a scribing head capable of maintaining the load precisely accurate for pressing the scribing line forming means (e.g., cutter wheel) onto a substrate and being structurally compact when viewed from the movement direction of the scribing head in a scribing step; and a scribing apparatus including the scribing head.

A scribing head according to the present invention includes: a scribing line forming means structured so as to form a scribing line on a substrate; and a moving means for moving the scribing line forming means such that the scribing line forming means presses the substrate with a constant magnitude, wherein the moving means includes: a rotation means rotating about a rotation axis, the axial center of the rotation axis being provided so as to align with a predetermined direction in which the scribing line forming means moves, and a motive power transmission means for transmitting a motive power between the motive power transmission means and the scribing line forming means such that the scribing line forming means moves on a straight line along the axial center of the rotation axis in response to the rotation of the rotation means, the motive power transmission means being provided along the predetermined direction, thereby the objective described above being achieved.

According to the scribing head and the scribing apparatus of the present invention, a rotating means, a motive power transmission means and a scribing line forming means are provided in line along the direction in which the scribing line forming means moves. Therefore, neither the rotation means nor the motive power motive transmission means is provided on the side of the scribing line forming means. As a result, it is possible to omit the space on the side of the scribing line forming means.

While the motive power transmission means continues the transmission of motive power between the motive power transmission means and the scribing line forming means, the scribing line forming means may form the scribing line on the substrate.

As described above, the scribing line forming means can form the scribing line on the substrate G without the transmission of motive power between the motive power transmission means and the scribing line forming means being interrupted. As a result, the scribing line forming means can always press against the substrate G.

The motive power transmission means may be structured such that the transmission efficiency of the force to be transmitted to the scribing line forming means from the motive power transmission means and the transmission efficiency of the force to be transmitted to the motive power transmission means from the scribing line forming means are approximately the same.

The motive power transmission means can effectively convert the change of force, received from the scribing line forming means, into a rotational direction and transmit it to the rotation means. Furthermore, the motive power transmission means can effectively convert the change of force, received from the rotation means, into a linear direction and transmit it to the scribing line forming means. As a result, the scribing line forming means can be effectively press against the substrate with a constant magnitude.

The motive power transmission means may include a face which is tilted by approximately 45 degrees with respect to the circumferential direction of the rotation axis along a direction in which the motive power transmission means rotates. The motive power transmission means can most effectively convert the change of force, received from the scribing line forming means, into a rotational direction and transmit it to the rotation means. Furthermore, the motive power transmission means can most effectively convert the change of force, received from the rotation means, into a linear direction and transmit it to the scribing line forming means. As a result, the scribing line forming means can effectively press against the substrate with a constant magnitude.

The motive power transmission means may include a cylindrical cam.

The motive power transmission means may include a ball screw.

The substrate may be a kind of substrate among a glass plate, a glass substrate, a quartz plate, a quartz substrate, a sapphire plate, a sapphire substrate, a semiconductor wafer, a ceramic plate, a ceramic substrate, a solar cell substrate, a liquid crystal display panel, an organic EL panel, an inorganic EL panel, a transmissive projector substrate and a reflective projector substrate.

A scribing apparatus according to the present invention includes: at least one scribing head described above; and a first moving means for moving the scribing head on a surface, the surface being approximately parallel to the substrate, such that the scribing line forming means forms the scribing line on the substrate, thereby the objective described above being achieved.

In the scribing apparatus according to the present invention, the scribing head according to the present invention is provided. Therefore, a rotating means, a motive power transmission means and a scribing line forming means are provided in line along the direction in which the scribing line forming means moves. Therefore, the motive power transmission means not is provided on the side of the scribing line forming means. As a result, it is possible to omit the space on the side of the scribing line forming means.

At least two scribing heads of the at least one scribing head described above are provided approximately parallel to a scribing direction.

In the scribing apparatus according to the present invention, the scribing head according to the present invention, which requires only a small amount of attachment space, is provided. Thus, a plurality of scribing heads can be provided with a smaller amount of space than that required when a conventional scribing head is provided.

Furthermore, since at least two scribing heads according to the present invention is provided approximately vertical to the scribing direction, scribing lines, the number of which corresponds to the number of plurality of scribing heads, are formed with close intervals. As a result, it is possible to cut a plurality of unit substrates from one substrate at once thereby improving the production efficiency.

According to the scribing head and the scribing apparatus of the present invention, a rotating means, a motive power transmission means and a scribing line forming means are provided in line along the direction in which the scribing line forming means moves. Therefore, neither the rotation means nor the motive power transmission means is provided on the side of the scribing line forming means. As a result, it is possible to omit the space on the side of the scribing line forming means.

26 axle bearing
27 turning axis
28 holder
29 cutter wheel
501 side wall
502 servo motor
503 cylindrical cam
504 holder holding member
505 elastic member
506 cam follower
507 linear bearing
510 scribing line forming mechanism
700 cylindrical cam-type scribing head

BEST MODE FOR CARRYING OUT THE INVENTION

Hereinafter, Embodiments of the present invention will be described with reference to the accompanying drawings.

1. Scribing Apparatus

Figure 1:
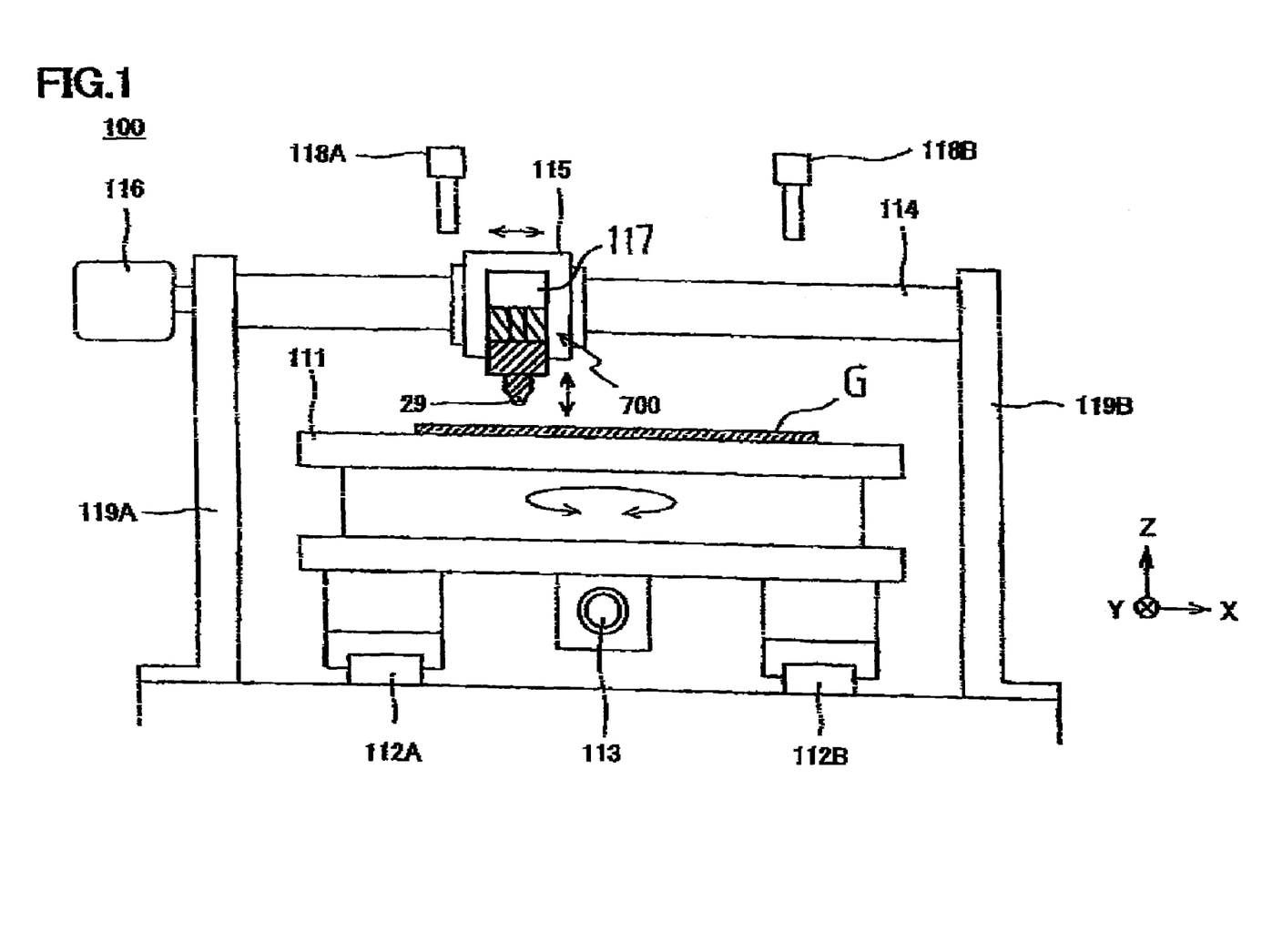
FIG. 1 is a diagram showing an example of a structure of a scribing apparatus 100 according to an Embodiment of the present invention.

FIG. 1 shows an example of a structure of a scribing apparatus 100 according to an Embodiment of the present invention. The scribing apparatus 100 includes a table 111, a first guide rail 112A, a second guide rail 112B and a ball screw 113.

The table 111 is structured so as to be rotatable in a horizontal plane. A vacuum adsorption means (not shown) is provided in the table 111. The vacuum adsorption means fixes a substrate G (e.g., brittle substrate including a glass plate) mounted on the table 111 to the table 111. The first guide rail 112A and the second guide rail 112B support the table 111 such that the table 111 is movable in the Y-direction. The first guide rail 112A and the second guide rail 112B are provided in parallel to each other. The ball screw 113 moves the table 111 along the first guide rail 112A and the second guide rail 112B.

The scribing apparatus 100 further includes a first pillar 119A, a second pillar 119B, a guide bar 114, a sliding unit 115 and a first motor 116.

The scribing apparatus 100 further includes a scribing head 700, a second motor 117 for moving the scribing head 700 upward and downward, a first CCD camera 118A, a second CCD camera 118B. The scribing head 700 is provided in the sliding unit 115. The second motor 117 moves the scribing head 700 upward and downward prior to and subsequent to the scribing step. The second motor fixes the scribing head 700 to a predetermined height in the scribing step and holds it.

The first CCD camera 118A and the second CCD camera 118B are provided above the guide bar 114 and detect an alignment mark formed on the substrate G.

The first pillar 119A and the second pillar 119B are vertically provided on a base of the scribing apparatus 100 having the first guide rail 112A and the second guide rail 112B interposed therebetween. The guide bar 114 is provided above the table 111 along the X-direction and constructed between the first pillar 119A and the second pillar 119B. The sliding unit 115 is provided on the guide bar 114 so as to be slidable. The first motor 116 slides the sliding unit 115 along the guide bar 114.

The scribing head 700 presses the cutter wheel 29 onto the surface of the substrate G. When the motor 116 slides the sliding unit 115, the scribing head 700 moves along the guide bar 114. As a result, the cutter wheel 29 moves on the surface of the substrate G while it is being pressed onto the surface of the substrate G. As a result, a scribing line is formed on the surface of the substrate G.

The structure can be made by omitting the second motor 117, in which the scribing line forming means 29 is caused to move upward and downward prior to and subsequent to the scribing step by the operation of the scribing head 700. The scribing head 700 will be described later.

2. Scribing Head

Figure 2:
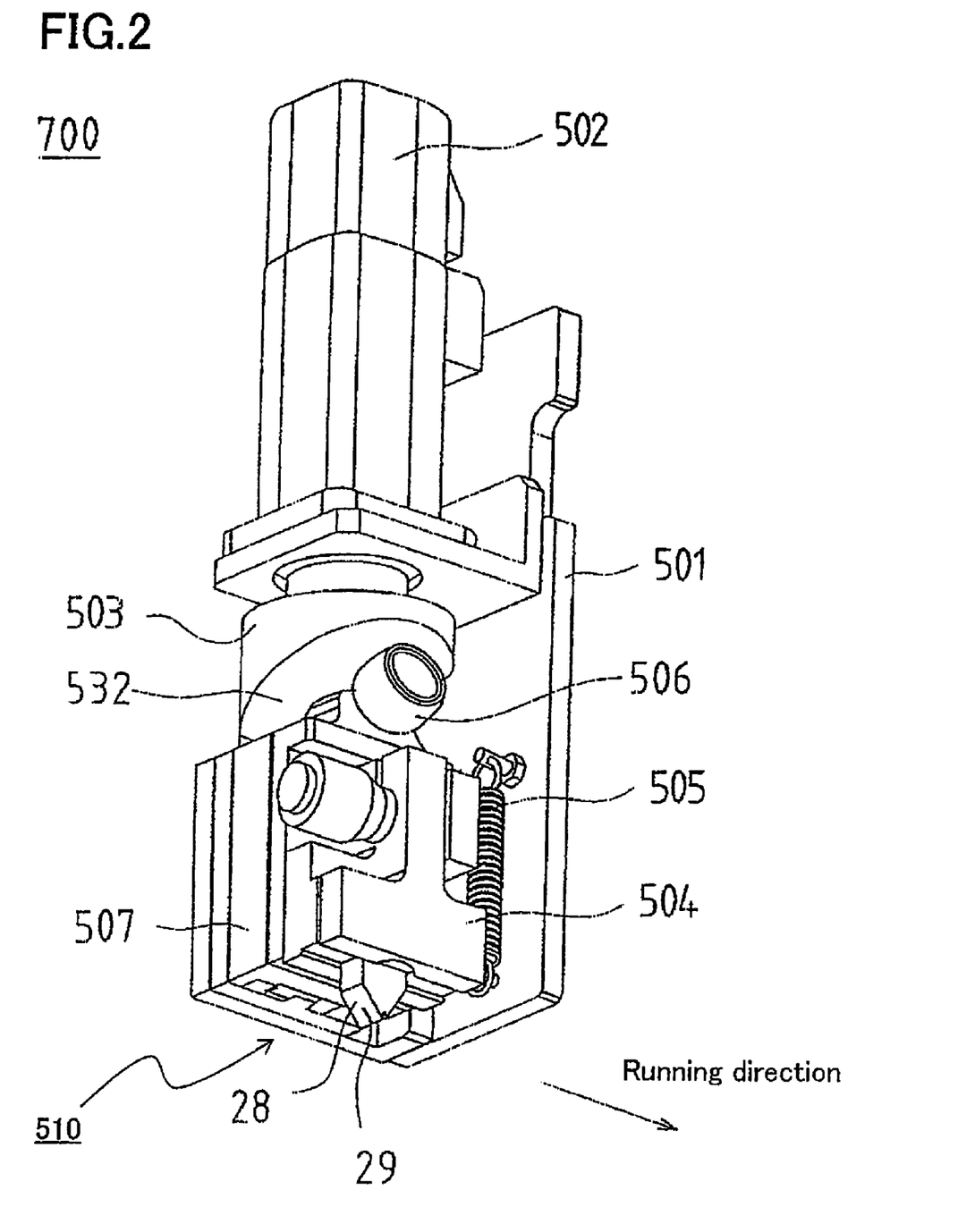
FIG. 2 is a diagram showing a structure of a cylindrical cam-type scribing head 700 according the Embodiment of the present invention.
Figure 3:
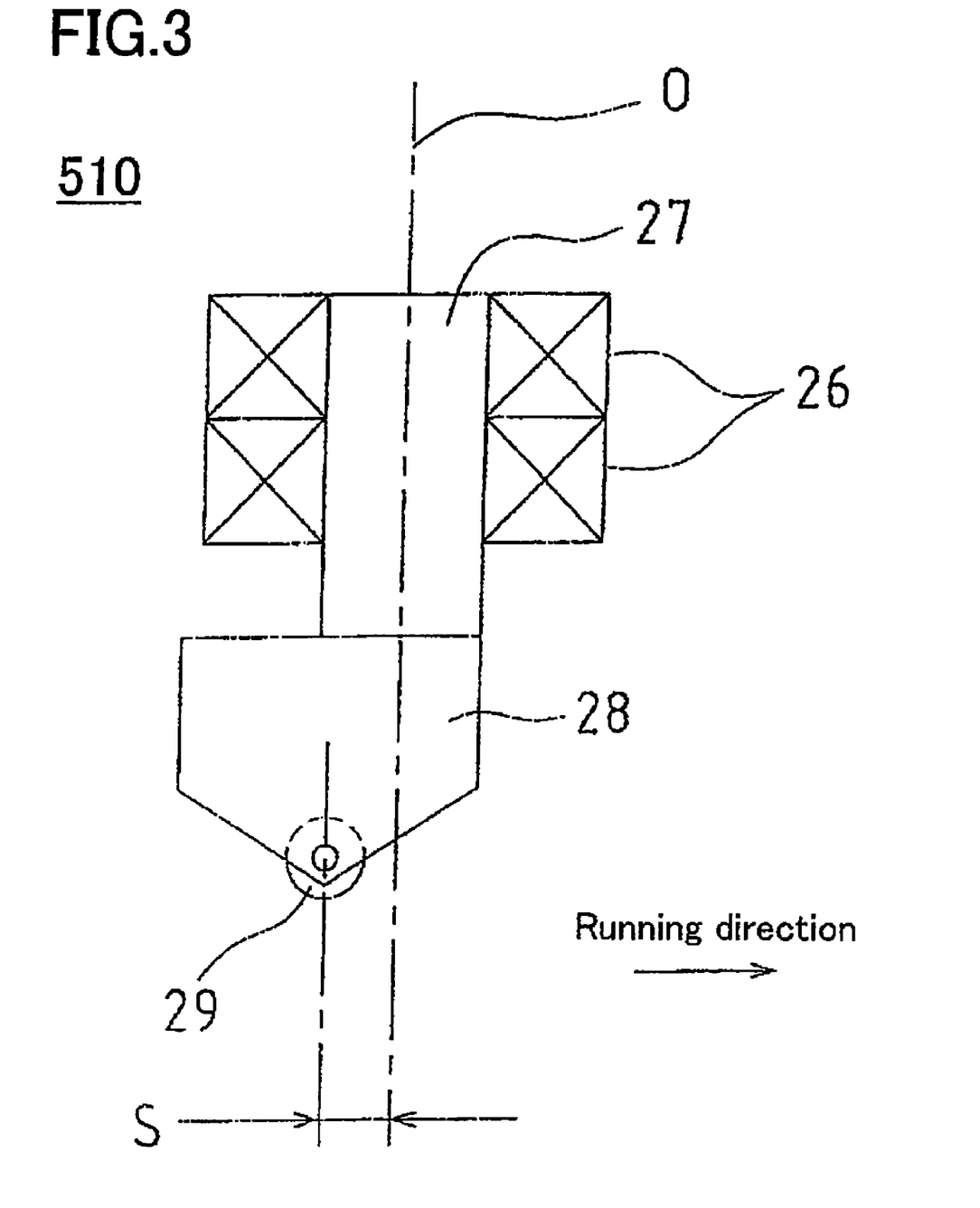
FIG. 3 is a diagram showing a structure of a scribing line forming mechanism 510 included in the scribing head 700.

FIG. 2 shows a structure of the scribing head 700 according the Embodiment of the present invention. FIG. 3 shows a structure of a scribing line forming mechanism 510 included in the scribing head 700. Hereinafter, the structure of the scribing head 700 according to the Embodiment of the present invention will be described with reference to FIG. 2 and FIG. 3.

The cylindrical cam-type scribing head 700 includes a side wall 501, a servo motor 502, a cylindrical cam 503, a cam follower 506, a holder holding member 504, an elastic member 505, a linear bearing 507 and a scribing line forming mechanism 510. The servo motor 502 is fixed to the side wall 501 in an upside down manner. The cylindrical cam 503 is connected to the output axis of the servo motor 502. The cam follower 506 contacts a cam face 532 included in the cylindrical cam 503. The holder holding member 504 axially supports the cam follower 506 such that the cam follower 506 is rotatable. The elastic member 505 energizes the holder holding member 504 in a direction toward the cylindrical cam 503. The linear bearing 507 is fixed to the side wall 501 and engages the holder holding member 504 in a manner such that the linear bearing 507 can move the holder holding member 504 upward and downward. The scribing line forming mechanism 510 and the cam follower 506 integrally move upward and downward via the holder holding member 504 or the like, and transmits an external force in the upward and downward direction, which is applied from the cam 503 and the substrate G, to the substrate G and the cam 503, respectively.

The scribing line forming mechanism 510 includes an axle bearing 26 attached to the holder holding member 504, a turning axis 27 which is axially supported by the axle bearing 26 so as to be rotatable, a holder 28 which is rotatable about the turning axis 27 and a scribing line forming means 29 which is rotatable about a pin inserted at the lower end of the holder 28 (see FIG. 3). The scribing line forming means 29 includes, for example, a cutter wheel.

Hereinafter, a plurality of components included in the scribing head 700 will be described in detail with reference back to FIG. 2.

The servo motor 502 energizes the cam follower 506 via the cylindrical cam 503 such that the scribing line forming means 29 presses the substrate G with a predetermined load. For convenience in describing the operation of the servo motor 502 in the Embodiment of the present invention, the turning direction of the rotation axis of the servo motor 502 which moves the cam follower 506 downward is a positive direction and the turning direction of the rotation axis of the servo motor 502 which moves the cam follower 506 upward is a negative direction. The rotating operations of the turning axis in the positive direction and the negative direction are referred to as a "positive rotation" and a "negative rotation", respectively.

The servo motor 502 is provided such that the central axis of the rotation axis of the servo motor 502 is along the direction in which the holder holding member 504 moves upward and downward.

The cylindrical cam 503 is connected to an output axis of the servo motor 502 and is provided between the servo motor 502 and the holder holding member 504. The cylindrical cam 503 transmits the motive power between the cylindrical cam 503 and the scribing line forming means 29 such that the scribing line forming means 29 moves on a straight line along the central axis of the rotation axis in accordance with the rotation of the servo motor 502. Specifically, the cam face 532 of the cylindrical cam 503 is tilted along the rotation axis of the cylindrical cam 503 by a predetermined angle (hereinafter, referred to as a "lead angle"). The position of a part of the cam face 532, the part contacting the cam follower 506 in a direction in which the cam follower 506 moves upward and downward, changes along with the rotation of the cylindrical cam 503. Therefore, when the rotation axis of the servo motor 502 is rotated, the scribing line forming means 29 integrally moves upward and downward with the cam follower 506. When the function of the cam 503 is viewed from a point of force to be transmitted by the cam 503, the cam follower 506 is energized in a direction in which the cam follower 506 moves upward and downward by a partial force in a direction, in which the cam follower 506 moves upward and downward in accordance with the tilted angle of the cam face 532, of the output of the servo motor 502 transmitted to the cam follower 506 via the cylindrical cam 503.

As described above, according to the scribing head 700, the servo motor 502, the cylindrical cam 503 and the scribing line forming means 29 are provided in line along the direction in which the scribing line forming means 29 moves upward and downward. Therefore, neither the servo motor 502 nor the motive power transmission means between the servo motor 502 and the scribing line forming means 29 is provided on the side of the scribing line forming means 29. As a result, it is possible to omit the space on the side of the scribing line forming means 29.

In the scribing step, the cam 503 and the cam follower 506 press against each other due to the energizing force by the servo motor 502 and the reaction force, from the substrate G, to this energizing force. Thus, the cam follower 506 and the cam face 532 are always in contact with each other. While the cylindrical cam 503 continues the transmission of motive power between the servo motor 502 and the scribing line forming means 29, the scribing line forming means 29 forms a scribing line on the substrate G. As described above, the scribing line forming means 29 can form the scribing line on the substrate G without the transmission of motive power between the servo motor 502 and the scribing line forming means 29 being interrupted. As a result, the scribing line forming means 29 can always press against the substrate G.

The cam face 532 of the cylindrical cam 503 is structured such that the transmission efficiency of the pressuring force to be transmitted to the scribing line forming means 29 from the servo motor 502 and the transmission efficiency of the reaction force to be transmitted to the servo motor 502 from the scribing line forming means 29 are approximately the same.

In both cases: in which the cam 503 and the servo motor 502 are rotated in the negative direction when the increase of the reaction force applied to the scribing line forming means 29 from the substrate G increases the force for the cam follower 506 to press against the cam face 532; and in contrast, in which the cam 503 and the servo motor 502 are rotated in the positive direction when the decrease of the load of the scribing line forming means 29 to the substrate G decreases the force for the cam follower 506 to press against the cam face 532 due to the undulations of the main surface of the substrate G, the responsiveness of the servo motor 502 can be approximately the same. Therefore, when the torque of the rotation axis of the servo motor 502 is maintained to be constant, the scribing line forming means 29 can move upward and downward along the undulations of the surface of the substrate G, and the load applied to the substrate G from the scribing line forming means 29 can be kept at a constant predetermined value. As a result, the scribing line forming means 29 can press against the substrate G with a constant load.

The lead angle of the cylindrical cam 503 is preferably about 45 degrees. In this case, the transmission efficiency of power which the cylindrical cam 503 receives from the cam follower 506, converts into a power in a rotational direction and transmits it to the servo motor 502; and the transmission efficiency of power which cylindrical cam 503 receives from the servo motor 502 and converts into a power in a upward-and-downward direction and transmits it to the cam follower 506, can be approximately the same.

Furthermore, the load of the scribing line forming means 29 in the upward-and-downward direction and the rotational torque of the motor axis of the servo motor 502 can be linearly maintained. Furthermore, the position of the scribing line forming means 29 in the upward-and-downward direction and the rotation position of the servo axis of the servo motor 502 can be linearly maintained. Thus, the scribing head 700 can easily perform the load control and position control of the scribing line forming means 29 without negatively affecting the responsiveness thereof when compared to the conventional scribing head 9 and scribing head 400.

According to the scribing head 700 of the present invention, the servo motor 502 rotates the cylindrical cam 503 by a positive direction or a negative direction. Thus, it is possible to move the holder holding member 504 upward and downward along the linear bearing 507 via the cam follower 506. As a result, the scribing line forming mechanism 510 can be moved upward and downward.

According to the scribing head 700 of the present invention, the cylindrical cam 503 is rotated by rotatingly driving the servo motor 502, thereby moving the holder holding member 504 via the cam follower 506. Thus, the position of the upward-and-downward direction of the holder holding member 504 changes smoothly. As a result, compared to the conventional scribing head 400 (see FIG. 9) and scribing head A (see Reference 2) which energizes the cutter wheel using a gear, an excellent following capability of the scribing line forming means 29 for undulations on the surface of the substrate G can be obtained.

Furthermore, according to the scribing head 700 of the present invention, it is possible to move the scribing line forming mechanism 510 upward and downward in a straight line manner. Thus, compared to the case in which the scribing line forming mechanism 21 is provided in the holder holding member 404 which turns as in the case of the conventional scribing head 9 and scribing head 400, the change of the torque to be transmitted to the scribing line forming means 29 is small. Furthermore, responsiveness of the upward-and-downward operation of the scribing line forming mechanism 510 is improved.

Furthermore, according to the cylindrical cam-type scribing head 700, since the structure of the scribing head can be compact, there is an advantage that it can be accommodated in a small footprint space.

As described above, the scribing head and the scribing apparatus according to the Embodiment of the present invention has been described with reference to FIG. 1 to FIG. 3.

In the examples shown in FIG. 1 to FIG. 3, the scribing line forming means 29 corresponds to "a scribing line forming means structured so as to form a scribing line on a substrate", the servo motor 502 and the cylindrical cam 503 correspond to "a moving means for moving the scribing line forming means such that the scribing line forming means presses the substrate with a constant magnitude", the servo motor 502 corresponds to "a rotation means rotating about a rotation axis, the axial center of the rotation axis being provided so as to align with a predetermined direction in which the scribing line forming means moves", and the cylindrical cam 503 corresponds to "a motive power transmission means for transmitting a motive power between the motive power transmission means and the scribing line forming means such that the scribing line forming means moves on a straight line along the axial center of the rotation axis in response to the rotation of the rotation means, the motive power transmission means being provided along the predetermined direction". Furthermore, the first motor 116 corresponds to "a first moving means for moving the scribing head on a surface such that the scribing line forming means forms the scribing line on the substrate, the surface being approximately parallel to the substrate".

However, the scribing head and the scribing apparatus according to the Embodiment of the present invention are not limited to those shown in FIG. 1 to FIG. 3. A scribing head and a scribing apparatus having arbitrary structure can be included in the scope of the present invention as long as the function of each means described above is achieved.

3. Control of the Operation of the Scribing Head

Figure 4:
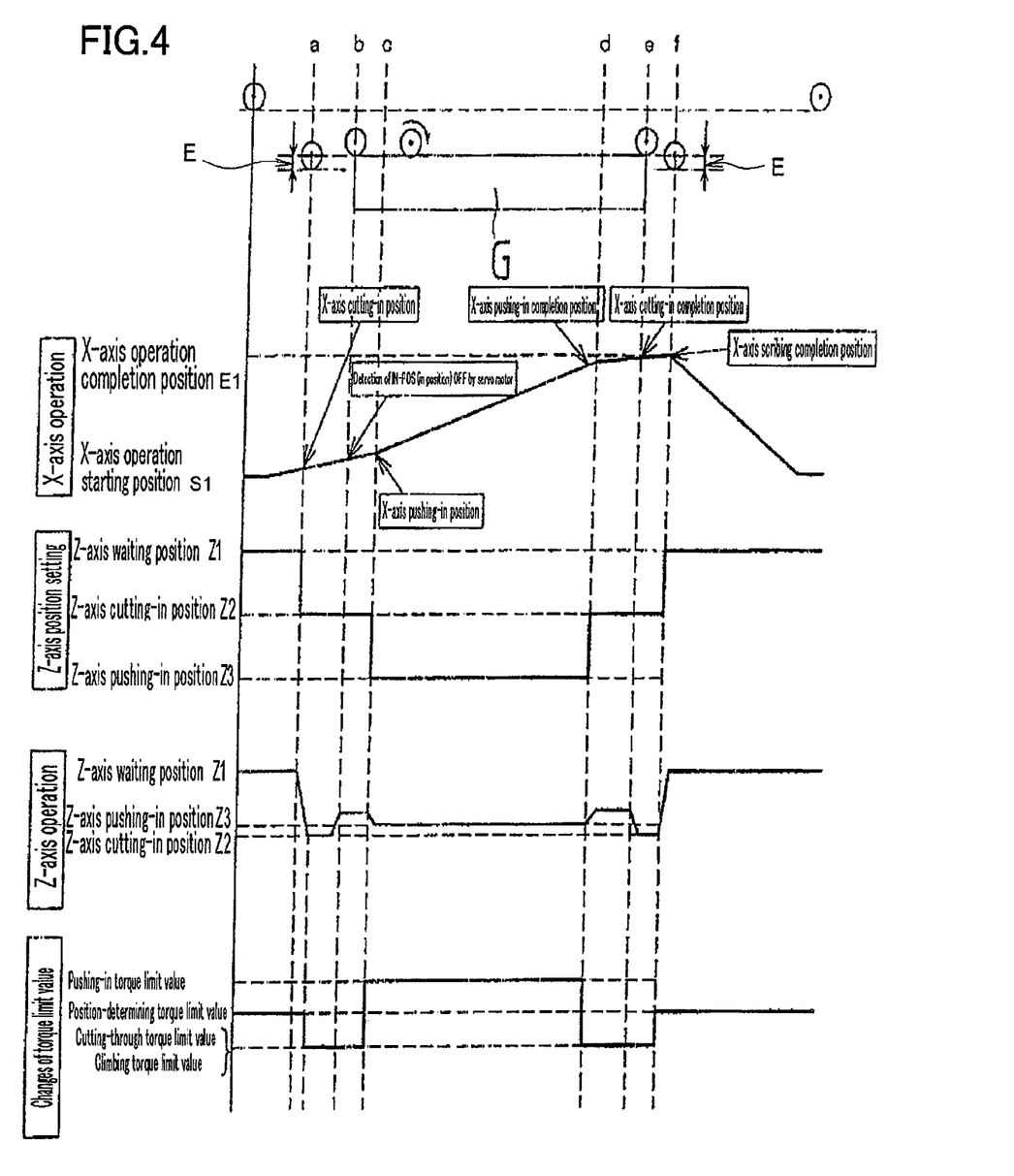
FIG. 4 is a diagram showing a controlling process procedure for controlling the scribing head 700 according to the Embodiment of the present invention.

FIG. 4 shows a controlling process procedure for controlling the scribing head 700 according to the Embodiment of the present invention. Hereinafter, the controlling process procedure for controlling the scribing head 700 in order to scribe the substrate G by the scribing head 700 will be described with reference to FIG. 4.

Specifically, FIG. 4 shows a timing-chart of the operation of the scribing line forming means 29 for forming one scribing line. Categories are: an X-axis operation (operation in which the scribing head 700 moves on the substrate); a Z-axis position setting (setting position of the scribing line forming means 29 in a vertical direction); a Z-operation (operation in which the scribing line forming means 29 moves in the vertical direction); and changes of a torque limit value (changes of the torque limit value of the servo motor 502).

An example, in which the scribing line forming means 29 moves from the left (position a) to the right (position e) on the substrate G in order to scribe in a direction which the positional data in the X-axis increases, is shown. In the example which will be described with reference to FIG. 4, the torque of the servo motor 502 is limited based on the position data in the X-axis.

First, the position data in the X-axis is set in a control section which is included in the gear-type scribing head 700. The position data in the X-axis includes: data showing an X-axis cutting-in position (position a); data showing an X-axis pushing-in position (position c); data showing an X-axis pushing-in completion position (position d); data showing an X-axis cutting-in completion position (position e); and data showing an X-axis scribing completion position (position f). The X-axis cutting-in position (position a), the X-axis pushing-in position (position c), the X-axis pushing-in completion position (position d), the X-axis cutting-in completion position (position e) and the X-axis scribing completion position (position f) exist between an X-axis operation starting position (position S1) and an X-axis operation completion position (position E1).

After the position data in the X-axis is set in the control section, the process proceeds to step 1.

Step 1: In the operation of the scribing line forming means 29 for forming one scribing line, a position-determining torque value is output. After the position-determining torque value is output, the process proceeds to step 2.

Step 2: The scribing line forming means 29 is moved to a Z-axis waiting position (position Z1). After the scribing line forming means 29 is moved, the process proceeds to step 3.

Step 3: At the time when the scribing line forming means 29 has moved to the X-axis cutting-in position (position a), the scribing line forming means 29 moves to a Z-axis cutting-in position (position Z2), and the position along the Z-axis of the scribing line forming means 29 is held. The Z-axis cutting-in position (position Z2) is a position where the scribing line forming means 29 has moved downward by E from point 0 (surface of the substrate G) in the vertical direction. After the position is held, the process proceeds to step 4.

Step 4: A climbing torque limit value is set, and the servo motor 502 outputs the climbing torque limit value. In other words, when the scribing line forming means 29 moves in the horizontal direction and climbs the substrate G (position b), the position of the scribing line forming means 29 in the Z-axis cutting-in position is deviated. Thus, while IN-POS (in position) signal output from a servo amplifier is ON, the servo motor 502 tries to move the position of the scribing line forming means 29 back to the original Z-axis cutting-in position and increases the torque, thereby causing the need for limiting the climbing torque. Therefore, the climbing torque limit value is set. The climbing torque limit value is a small value such that a chip does not occur at the end of the substrate G when the scribing line forming means 29 climbs the substrate G.

Step 5: When the scribing line forming means 29 has climbed the substrate G (position b), the position of the scribing line forming means 29 of the Z-axis cutting-in position is deviated. When the IN-POS (in position) signal output from the servo amplifier is OFF, a pushing torque limit value is set at position c by a controller which issues an instruction to the servo motor (e.g., NC or sequencer) after the scribing line forming means 29 has moved by a preset predetermined distance. The servo motor 502 outputs the pushing torque limit value. If the setting position in the Z-axis remains to be the Z-axis cutting-in position, a displacement is small, and an appropriate pushing torque for scribing cannot be obtained. Thus, the setting position in the Z-axis set at the Z-axis pushing position which is further below the Z-axis cutting-in position from the upper surface of the substrate G.

Step 6: The gear-type scribing head 700 is moved to the X-direction (position d) at a preset scribing speed by using the driving torque (which is limited to the pushing torque limit value) for trying to move to the Z-axis pushing position as a scribing pressure. When the gear-type scribing head 700 has reached position d, the process proceeds to step 7.

Step 7: The scribing speed is decreased to a cutting-through speed which can cut the substrate G. The cutting-through speed is preset. A cutting-through torque limit value is set. The servo motor 502 outputs the cutting-through torque limit value. The position in the Z-axis is set as the Z-axis cutting-in position. The cutting-through torque limit value is set as a small value as in the case of climbing such that a chip does not occur at the end of the substrate G when the scribing line forming means 29 is cutting through the substrate G (X-axis cutting-in completion position, position e).

Step 8: When the scribing line forming means 29 has cut through the substrate G (position e), the position of the scribing line forming means 29 in the vertical direction again returns to the Z-axis cutting-in position.

Step 9: When the gear-type scribing head 700 has reached position f, a position-determining torque is set, and the servo motor outputs the position-determining torque value. Then, the scribing line forming means 29 once again moves to the Z-axis waiting position. A series of scribing operations is completed.

When a scribing line is formed on the substrate G by the gear-type scribing head 700, as previously described, the cutting edge's ridge of the scribing line forming means 29 holds the position which overlaps the movement path of the axial center Q of the second turning axis run by the gear-type scribing head 700.

Therefore, a scribing line with a high degree of straightness is formed.

When the servo motor 502 is rotatingly driven, it is possible to move the scribing line forming means 29 upward and downward via the holder holding member 404. Thus, it is possible to directly act the rotating torque as a scribing pressure via the servo motor 502, and a scribing pressure appropriate for the substrate G can be arbitrarily selected.

4. Ball Screw-type Scribing Head

The scribing head 700 according to the Embodiment of the present invention uses the cylindrical cam 503 and the cam follower 506 as a motive power transmission means. However, the scribing head can use a ball screw instead.

Figure 5:
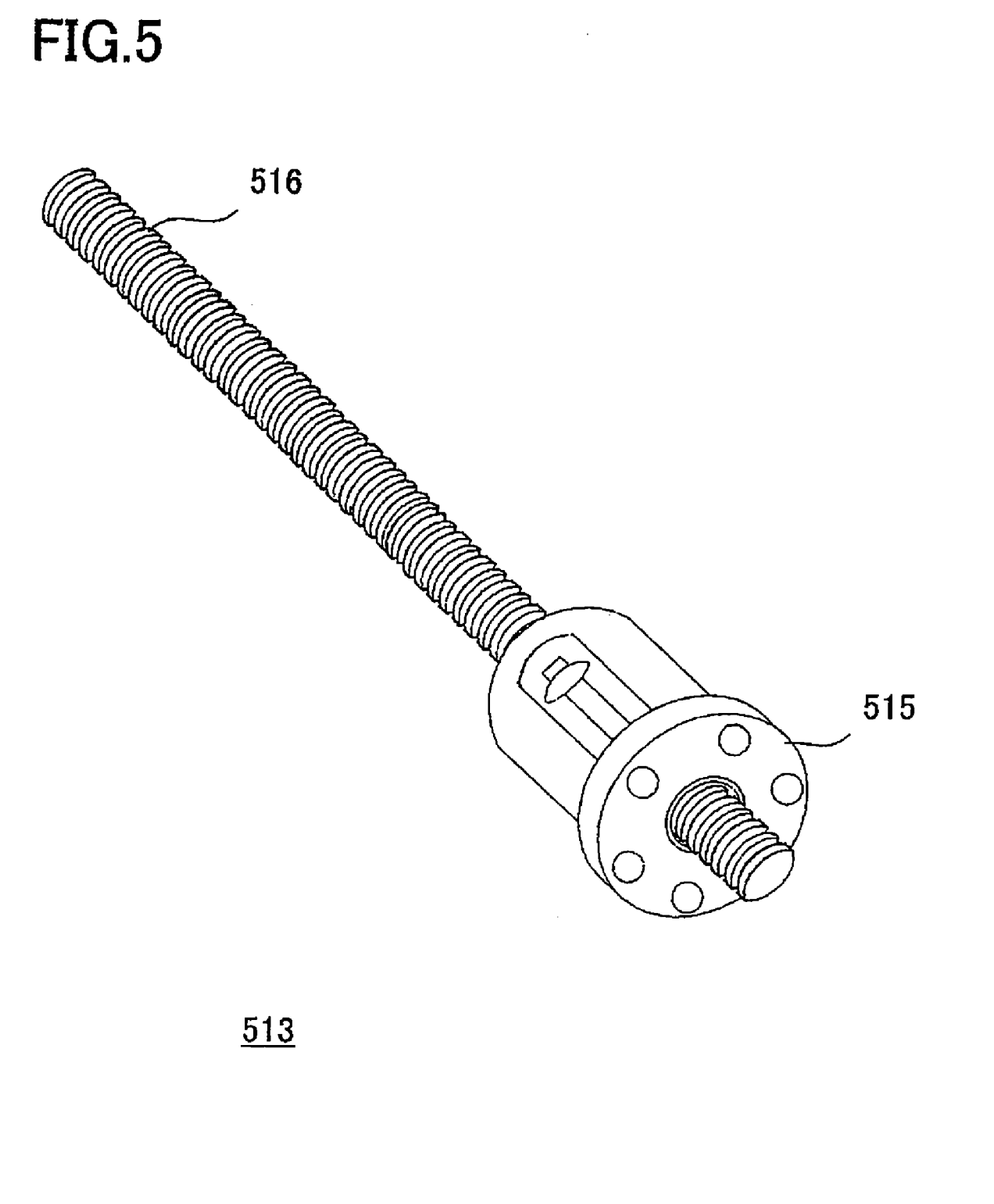
FIG. 5 is a diagram showing a structure of a ball screw 513.

FIG. 5 shows a structure of a ball screw 513. The ball screw 513 includes a ball screw nut 515 and a screw axis 516. Hereinafter, the structure of the scribing head including the ball screw 513 instead of the cylindrical cam 503 and the cam follower 506 will be described partly incorporating the reference to FIG. 2. The structure of the scribing head using the ball screw 513 as a motive power transmission means has the same structure as that of the scribing head 700 shown in FIG. 2 except that the cylindrical cam 503 and the cam follower 506 are changed to the ball screw 513.

The ball screw nut 515 is fixed to the holder holding member 504. The screw axis 516 is connected to the rotation axis of the servo motor 502. Thus, when the rotation axis of the servo motor 502 is rotated, the screw axis 516 rotates together with the rotation axis. Therefore, the ball screw nut 515 moves upward and downward along the axis direction of the screw axis 516, and the holder holding member 504 to which the ball screw nut 515 is fixed moves upward and downward.

When the motive power transmission means structured as described above is described in view of an acting force, the torque of the rotation axis of the servo motor 502 is transmitted as a force which tries to move the ball screw nut 515 and the scribing line forming means 29 downward via the screw axis 516. The reaction force generated when the scribing line forming means 29 is pressed onto the substrate G is transmitted as a force which tries to rotate the screw axis 516 and the rotation axis of the servo motor 502 in the negative direction via the ball screw nut 515.

5. Scribing Apparatus Including a Multi-head

Figure 6:
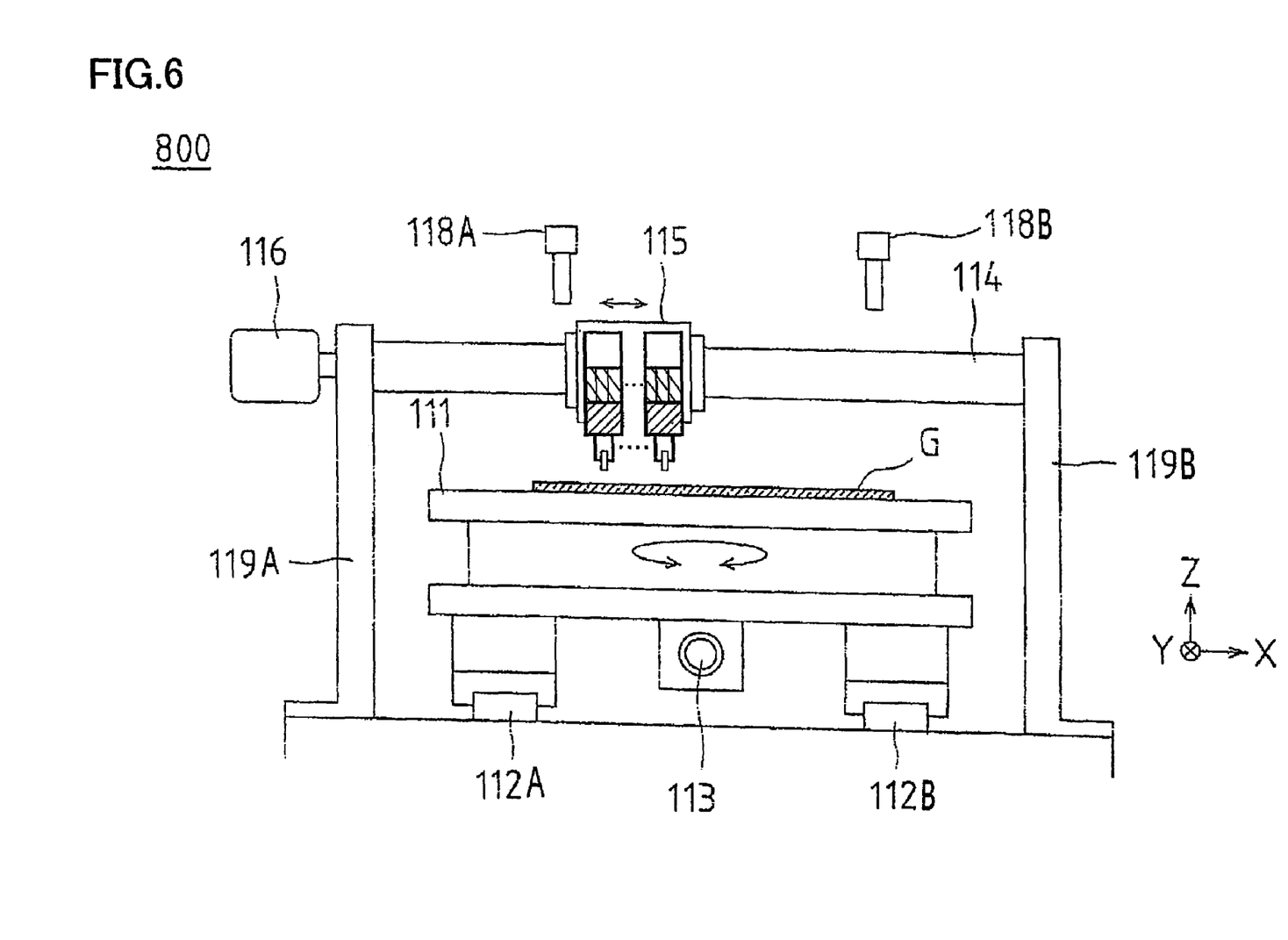
FIG. 6 is a diagram showing a structure of a scribing apparatus 800 which is another example of the scribing apparatus.

FIG. 6 shows a structure of a scribing apparatus 800 which is another example of the scribing apparatus. In FIG. 6, the same components as those shown in FIG. 1 are denoted by the same reference numerals, and the description thereof will be omitted.

The scribing apparatus 800 has the same structure as the scribing apparatus 100 which has been described with reference to FIG. 1 except that in the scribing head 800, a plurality of scribing heads is included, instead of the scribing head 700 included in the scribing apparatus 100. The plurality of scribing heads is arranged in line in the X-direction (lateral direction in FIG. 6). When the table 111 on which the substrate G is mounted is moved in the Y-direction, a plurality of scribing lines along the Y-direction is formed on the substrate G.

The plurality of scribing heads described above includes at least one of the scribing head 700 which has been described with reference to FIG. 2 and the scribing head using the ball screw-type motive power transmission means which has been described with reference to FIG. 5.

In any one of the scribing heads according to the Embodiment, the servo motor 502 is mounted in the vertical direction. Particularly, only a small amount of footprint space is required when viewed from the movement direction of the scribing head. Therefore, when compared to the conventional scribing head in which the servo motor is used for a pressing means, it is possible to shorten the interval between each scribing line forming means 29 included in the scribing head. When a plurality of scribing heads is mounted in a scribing apparatus, numerous scribing heads can be attached within a small amount of space when compared to a conventional scribing head having a motor mounted thereon.

The scribing apparatus 800 according to the present invention runs the plurality of scribing heads simultaneously. Therefore, scribing lines, the number of which corresponds to the number of the plurality of scribing heads, are formed in close intervals. As a result, when a plurality of unit substrates are cut from one substrate, production efficiency can be improved.

In the scribing apparatus 800, a plurality of scribing heads is arranged in line in the X-direction. When the table 111 on which the substrate G is mounted is moved in the Y-direction, the scribing apparatus 800 forms scribing lines on the substrate G, the scribing lines being parallel to the Y-direction. Alternatively, in the scribing apparatus 800, a plurality of scribing heads is arranged in line in the Y-direction. When the plurality of scribing heads is moved along the guide bar 114, the scribing apparatus 800 may form scribing lines on the substrate G, the scribing lines being parallel to the X-direction.

The scribing apparatus 800 according to the Embodiment includes a plurality of scribing heads in line, thereby simultaneously forming a plurality of scribing lines on one surface of the substrate. In addition to this, for example, a plurality of scribing heads may be arranged in the scribing apparatus 800 such that the scribing line forming means 29 is contacted to each substrate of a bonded substrate for which two brittle material substrates are bonded and one or more scribing line are simultaneously formed on each substrate.

As described above, the Embodiment of the present invention has been described with reference to FIG. 1 to FIG. 6.

Each means described in the Embodiment shown in FIG. 1 to FIG. 6 can be implemented by hardware, software or the combination of the hardware and the software. Even if each means is implemented by hardware, software or the combination of the hardware and the software, a scribing line forming processing for performing the function of the scribing head according to the present invention or the scribing apparatus according to the present invention can be performed. The scribing line forming processing has arbitrary procedures as long as it can perform the function of the scribing head according to the present invention or the scribing apparatus according the present invention.

For example, a scribing line forming processing program for causing an execution of the function of the scribing head according to the present invention or the function of the scribing apparatus according to the present invention is stored in the scribing head according to the present invention or the scribing apparatus according to the present invention.

When the scribing head or scribing apparatus is shipped, the processing program can be previously stored in a storage means included in the scribing head or the scribing apparatus. Alternatively, after the scribing head or scribing apparatus is shipped, the processing program can be stored in the storage means. For example, a user can download a processing program with or without charge from a particular website on the Internet and install the processing program downloaded onto a scribing head or a scribing apparatus.

When a processing program is recorded in a computer-readable recording medium (e.g., flexible disc, CD-ROM and DVD-ROM), the processing program can be installed in a scribing head or a scribing apparatus by using an input device. The processing program installed is stored in the storage means.

The scribing head and the scribing apparatus according to the present invention can be applied to the cutting of, for example, a liquid crystal display panel, a plasma display panel, an organic EL panel, an inorganic EL panel which are a kind of flat display panel, a transmissive projector substrate and a reflective projector panel.

Furthermore, the scribing head and the scribing apparatus according to the present invention can be applied to the cutting of, for example, one single substrate (e.g., glass plate, glass substrate, quartz plate, quartz substrate, sapphire plate, sapphire substrate, semiconductor wafer, ceramic plate and ceramic substrate). Furthermore, the scribing line forming mechanism, the scribing head and the scribing apparatus according to the present invention can be effectively applied to the cutting of a bonded substrate for which a plurality of substrates are bonded.

As described above, the scribing line forming mechanism, the scribing line head and the scribing apparatus according to the present invention have been described above with reference to FIG. 1 to FIG. 6. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

According to the scribing head and the scribing apparatus of the present invention, a rotating means, a motive power transmission means and a scribing line forming means are provided in line along the direction in which the scribing line forming means moves. Therefore, neither the rotation means nor the motive power transmission means is provided on the side of the scribing line forming means. As a result, it is possible to omit the space on the side of the scribing line forming means.

The invention claimed is:

1. A scribing head comprising:
    a scribing line forming means structured so as to form a scribing line on a substrate; and
    a moving means for moving the scribing line forming means such that the scribing line forming means presses the substrate with a constant magnitude, wherein the moving means includes:
        a rotation means rotating about a rotation axis, the axial center of the rotation axis being provided so as to align with a predetermined direction in which the scribing line forming means moves, wherein the substrate is pressed upon moving the scribe line forming means to the direction of the substrate and providing a positive rotation of the rotary shaft of the rotational means, and moving by forcing back to the direction of the rotational means, thereby reversely rotating the rotary shaft of the rotational means, and
        a motive power transmission means for transmitting a motive power between the motive power transmission means and the scribing line forming means such that the scribing line forming means moves on a straight line along the axial center of the rotation axis in response to the rotation of the rotation means, the motive power transmission means being provided along the predetermined direction.

2. A scribing head according to claim 1, wherein while the motive power transmission means continues the transmission of motive power between the motive power transmission means and the scribing line forming means, the scribing line forming means forms the scribing line on the substrate.

3. A scribing head according to claim 2, wherein the motive power transmission means includes a face which is tilted by approximately 45 degrees with respect to the circumferential direction of the rotation axis along a direction in which the motive power transmission means rotates.

4. A scribing head according to claim 1, wherein the motive power transmission means is structured such that the transmission efficiency of the force to be transmitted to the scribing line forming means from the motive power transmission means and the transmission efficiency of the force to be transmitted to the motive power transmission means from the scribing line forming means are approximately the same.

5. A scribing head according to claim 1, wherein the motive power transmission means includes a cylindrical cam.

6. A scribing head according to claim 1, wherein the motive power transmission means includes a ball screw.

7. A scribing head according to claim 1, wherein the substrate is a kind of substrate among a glass plate, a glass substrate, a quartz plate, a quartz substrate, a sapphire plate, a sapphire substrate, a semiconductor wafer, a ceramic plate, a ceramic substrate, a solar cell substrate, a liquid crystal display panel, an organic EL panel, an inorganic EL panel, a transmissive projector substrate and a reflective projector substrate.

8. A scribing head according to claim 1, further comprising a first moving means for moving the scribing head on a surface such that the scribing line forming means forms the scribing line on the substrate, the surface being approximately parallel to the substrate.

* * * * *